(12) United States Patent
Goyal et al.

(10) Patent No.: US 11,687,716 B2
(45) Date of Patent: Jun. 27, 2023

(54) MACHINE-LEARNING TECHNIQUES FOR AUGMENTING ELECTRONIC DOCUMENTS WITH DATA-VERIFICATION INDICATORS

(71) Applicant: Adobe Inc., San Jose, CA (US)

(72) Inventors: Navita Goyal, Karnataka (IN); Vipul Shankhpal, Madhya Pradesh (IN); Priyanshu Gupta, Uttar Pradesh (IN); Ishika Singh, Uttar Pradesh (IN); Baldip Singh Bijlani, Haryana (IN); Anandha velu Natarajan, Karnataka (IN)

(73) Assignee: Adobe Inc., San Jose, CA (US)

( * ) Notice: Subject to any disclaimer, the term of this patent is extended or adjusted under 35 U.S.C. 154(b) by 301 days.

(21) Appl. No.: 17/108,424

(22) Filed: Dec. 1, 2020

(65) Prior Publication Data

US 2022/0171935 A1     Jun. 2, 2022

(51) Int. Cl.
| | |
|---|---|
| *G06F 40/289* | (2020.01) |
| *G06F 40/35* | (2020.01) |
| *G06F 16/9038* | (2019.01) |
| *G06F 16/901* | (2019.01) |
| *G06N 5/022* | (2023.01) |
| *G06F 16/35* | (2019.01) |
| *G06F 40/30* | (2020.01) |
| *G06N 20/00* | (2019.01) |
| *G06N 5/02* | (2023.01) |

(52) U.S. Cl.
CPC .......... *G06F 40/289* (2020.01); *G06F 16/353* (2019.01); *G06F 16/9024* (2019.01); *G06F 16/9038* (2019.01); *G06F 40/30* (2020.01); *G06F 40/35* (2020.01); *G06N 5/022* (2013.01); *G06N 20/00* (2019.01); *G06N 5/02* (2013.01)

(58) Field of Classification Search
CPC ........ G06F 16/35; G06F 16/353; G06F 40/30; G06F 40/35; G06N 5/022; G06N 5/02; G06N 20/00
See application file for complete search history.

(56) References Cited

U.S. PATENT DOCUMENTS

| | | | |
|---|---|---|---|
| 2016/0070786 A1* | 3/2016 | Myslinski | ........... G06F 16/2365 709/204 |
| 2021/0406475 A1* | 12/2021 | Tang | ........................ G06F 40/30 |

(Continued)

OTHER PUBLICATIONS

Jiang et al. "HoVer: A dataset for many-hop fact extraction and claim verification." arXiv preprint arXiv:2011.03088 (Nov. 2020). (Year: 2020).*

(Continued)

*Primary Examiner* — Samuel G Neway
(74) *Attorney, Agent, or Firm* — Kilpatrick Townsend & Stockton LLP

(57) ABSTRACT

This disclosure involves executing machine-learning techniques for transforming or otherwise processing electronic data. This disclosure, for example, relates to executing machine-learning techniques to generate data-verification indicators that augment electronic documents to represent the veracity of text. The machine-learning techniques include neural networks trained to retrieve and analyze evidence regarding content of electronic documents and to generate indicators of veracity to be displayed with that content via electronic reading software.

20 Claims, 9 Drawing Sheets

(56) References Cited

U.S. PATENT DOCUMENTS

2022/0164546 A1* 5/2022 Jiang .................. G06F 40/284
2022/0171935 A1* 6/2022 Goyal .................. G06N 5/022

OTHER PUBLICATIONS

Zhou et al. "GEAR: Graph-based evidence aggregating and reasoning for fact verification." arXiv preprint arXiv: 1908.01843 (2019). (Year: 2019).*

Thorne et al. "Fever: a large-scale dataset for fact extraction and verification." arXiv preprint arXiv:1803.05355 (2018). (Year: 2018).*

Subramanian et al. "Hierarchical evidence set modeling for automated fact extraction and verification." arXiv preprint arXiv: 2010.05111 (Oct. 2020). (Year: 2020).*

Ferrucci et al., Building Watson: An Overview of the DeepQA Project, Ai Magazine vol. 31, No. 3, Sep. 2010, pp. 59-79.

Hanselowski et al., UKP-Athene: Multi-Sentence Textual Entailment for Claim Verification, arXiv:1809.01479v5, May 9, 2019, 6 pages.

Liu et al., Fine-grained Fact Verification with Kernel Graph Attention Network, arXiv:1910.09796v4, Jun. 20, 2021, 10 pages.

Nie et al., Combining Fact Extraction and Verification with Neural Semantic Matching Networks, arXiv:1811.07039v1, Nov. 16, 2018, 10 pages.

Stammbach et al., Team DOMLIN: Exploiting Evidence Enhancement for the FEVER Shared Task, Proceedings of the Second Workshop on Fact Extraction and Verification (FEVER), Association for Computational Linguistics, Nov. 2019, pp. 105-109.

Thorne et al., FEVER: A Large-Scale Dataset for Fact Extraction and Verification, In Proceedings of the 2018 Conference of the North American Chapter of the Association for Computational Linguistics: Human Language Technologies, vol. 1, Jun. 1-6, 2018, pp. 809-819.

Xiong et al., End-to-End Neural Ad-hoc Ranking with Kernel Pooling, arXiv:1706.06613v1, Jun. 20, 2017, 10 pages.

Yoneda et al., UCL Machine Reading Group: Four Factor Framework for Fact Finding (HexaF), Proceedings of the First Workshop on Fact Extraction and Verification (FEVER), Association for Computational Linguistics, Nov. 2018, pp. 97-102.

* cited by examiner

MACHINE-LEARNING TECHNIQUES FOR AUGMENTING ELECTRONIC DOCUMENTS WITH DATA-VERIFICATION INDICATORS

TECHNICAL FIELD

The present disclosure generally relates to machine-learning techniques for transforming or otherwise processing electronic data. More specifically, but not by way of limitation, the present disclosure relates to machine-learning techniques that generate data-verification indicators that are applied to electronic documents, such as techniques that use neural networks for retrieving and analyzing evidence regarding content of electronic documents and generating indicators of veracity to be displayed with that content via electronic reading software.

BACKGROUND

Online content has proliferated significantly. Identifying the veracity of statements (e.g., claims or assertions published online) is an important aspect of consuming content. With the bulk of information available online, it has become increasingly important to build technology that automatic determines the veracity of published statements. The wide necessity and applicability of such a technology has given rise to the research problem of Fact Extraction and Verification (FEVER), which has the objective of determining the veracity of a statement by identifying the supporting or refuting evidence contained in the set of documents. Generally, existing FEVER systems retrieve one or more sentences from the set of documents, which could serve as evidence when performing reasoning tasks, such as recognizing, via natural language processing, a textual entailment of the retrieved sentences with respect to a statement (e.g., reasoning over the selected sentences to determine the veracity of a statement). In a simplified example, a computing system that performs natural language processing on the statement "The sky was blue on November 2" could recognize a textual entailment of the statement with respect to a weather report indicating a lack of cloud cover on November 2 (e.g., the truth of the statement involving the blue sky follows logically from the weather report).

But existing FEVER systems do not provide feedback from the reasoning steps to the evidence extraction steps. For instance, in the example above in which the statement involves the blue sky on November 2, the reasoning step may be unable to classify the statement as supported or refuted, given the set of documents available (e.g., a classification of "not enough information" from the extracted evidence). In this situation, existing FEVER systems would not perform evidence extraction again to find additional content in the set of available document to support or refute the statement. Additionally, existing techniques are unable to handle the varying levels of complexity involved in combining the sentences retrieved across multiple documents to support or refute the veracity of the statement. For instance, in the example above in which the statement involves the blue sky, the statement may be "The sky was blue on November 2, but traffic was heavy on the Interstate 280." In this situation, the reasoning step has to consider multiple pieces of evidence from multiple documents in the set of available documents (e.g., the weather report for November 2 and a traffic report for the same day). But, existing FEVER systems are unequipped to verify real-world statements, which may need evidence in the form of multiple sentences retrieved from multiple documents to determine the veracity of the statements.

SUMMARY

Certain aspects and features of the present disclosure relate to a computer-implemented method. The computer-implemented method includes receiving an input indicating a selection of a target text segment and determining a veracity metric of the target text segment. Determining the veracity metric includes extracting a first text segment from an electronic document and generating, using a trained reasoning model, an output. The output classifies the first text segment as lacking information to support or refute the target text segment. The computer-implemented method includes extracting a second text segment from the electronic document or another electronic document in response to the trained reasoning model classifying the first text segment as lacking information to support or refute the target text segment. The computer-implemented method include classifying, with the trained reasoning model, a combination of the first text segment and the second text segment according to a degree to which the trained reasoning model measures whether the combination supports the target text segment. The computer-implemented method also includes generating an augmentation for a graphical interface to display, adjacent to the target text segment, a verification indicator representing the determined veracity metric of the target text segment. Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

Features, implementations, and advantages of the present disclosure are better understood when the following Detailed Description is read with reference to the accompanying drawings.

FIG. 7 depicts an example of an electronic document augmented to display multiple verification indicators, according to some aspects of the present disclosure.

DETAILED DESCRIPTION

Figure 1:
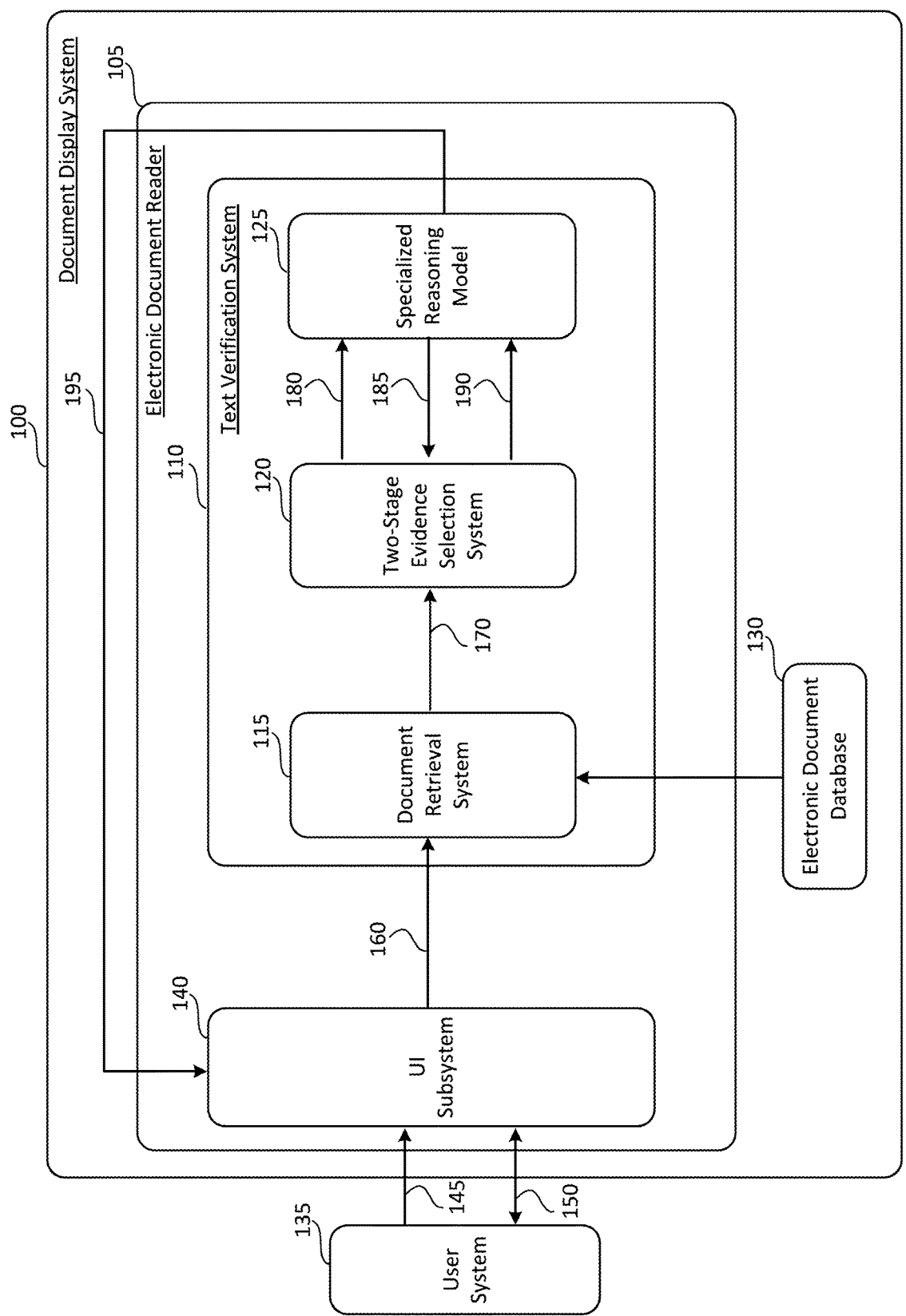
FIG. 1 depicts an example of a computing environment for determining the veracity of text segments, according to some aspects of the present disclosure.

Certain aspects of the present disclosure relate to executing machine-learning models to automatically infer the veracity of a target text segment (e.g., a statement) using evidence (e.g., one or more sentences) retrieved from electronic documents included in a text corpus (e.g., a set of electronic documents). For example, a text verification system, which could be included in or accessed by electronic reading software that displays electronic documents on a display of a user device, executes the machine-learning models described herein to perform an evidence extraction and verification function relating to a target text segment included in a target electronic document.

The text verification system determines the veracity metric of a target text segment by retrieving evidence retrieved from a text corpus stored in an electronic document database. For instance, the target electronic document is any electronic document being displayed on a user device by the document display system, and the target text segment is any alphanumeric text, such as a sentence (or a portion thereof), included in a target electronic document. Examples of the target text segment include an assertion, claim, declaration, evidence, contention, rejection, or denial. Evidence is retrieved in the form of evidence text segments, such as sentences (or portions of sentences) that are retrieved from the text corpus as evidence to support or refute the target text segment.

The text verification system includes a document retrieval system, a two-stage evidence selection model, and a specialized reasoning model that operate in a network to retrieve evidence, in the form of alphanumeric text segments, from the text corpus for the purpose of supporting or refuting the target text segment. The document retrieval system searches the text corpus for electronic documents that are relevant to the target text segment. The two-stage evidence selection model executes a lazy retrieval protocol to retrieve evidence text segments from the relevant electronic documents. The lazy retrieval protocol includes a first stage and a conditional second stage. During the first stage, the two-stage evidence selection model analyzes the relevant documents, retrieves evidence text segments that are directly relevant to the target text segment (referred to herein as first-stage evidence), and transmits the first-stage evidence to the specialized reasoning model. An evidence text segment is directly relevant to the target text segment if the evidence text segment supports or refute the target text segment on its own (e.g., without needing any additional information).

The specialized reasoning model reasons over the first-stage evidence and the target text segment to classify the veracity of the target text segment as supported by the first-stage evidence, refuted by the first-stage evidence, or undetermined based on a lack of information in the first-stage evidence (this step is referred to herein as a first stage of reasoning). If the specialized reasoning model classifies the veracity of the target text segment as supported or refuted by the first-stage evidence, then the text verification system causes the electronic reading software to augment the target electronic document by displaying a verification indicator in association with (e.g., adjacent to) the target text segment. The verification indicator represents the classification.

If, however, the specialized reasoning model classifies the veracity of the target text segment as undetermined, then the lazy retrieval protocol proceeds to the conditional second stage, wherein the two-stage evidence selection model retrieves evidence text segments that are indirectly relevant to the target text segment (referred to herein as second-stage evidence). An evidence text segment is indirectly relevant to the target text segment if the evidence text segment cannot support or refute the target text segment on its own, but rather, needs to the context of another evidence text segment to support or refute the target text segment. The specialized reasoning model reasons over the target text segment and a combination of the first-stage evidence and the second-stage evidence (this step is referred to as the second stage of reasoning). The specialized reasoning model classifies the veracity of the target text segment as supported by the first-stage evidence and the second-stage evidence or refuted by the first-stage evidence and the second-stage evidence. The text verification system causes the electronic reading software to augment the target electronic document by displaying a verification indicator in association with (e.g., adjacent to) the target text segment.

As an illustrative example, a target electronic document includes the following target text segment: "Ryan Gosling has been to a country in Africa." The text verification system receives a signal initiating the evidence extraction and verification function with respect to the target text segment. The document retrieval system retrieves relevant documents, such as documents relating to Ryan Gosling and documents relating to the country of Africa, from the text corpus. The two-stage evidence selection model analyzes the relevant documents to retrieve first-stage evidence. The first-stage evidence is a statement referring to Ryan Gosling: "Ryan Gosling has traveled to Chad, Uganda, and eastern Congo." The specialized reasoning model classifies the veracity of the target text segment using the first-stage evidence as undetermined because the first-stage evidence does not associate Chad with the country of Africa. In response, the two-stage evidence selection model proceeds to the conditional second stage, where the two-stage evidence selection model retrieves second-stage evidence from the relevant documents. The second-stage evidence is a statement referring to Africa: "Chad is a land-locked country in Central Africa." The specialized reasoning model reasons over the target text segment and a combination of the first-stage evidence ("Ryan Gosling has traveled to Chad, Uganda, and eastern Congo") and the second-stage evidence ("Chad is a land-locked country in Central Africa"). Lastly, the specialized reasoning model classifies the veracity of the target text segment ("Ryan Gosling has been to a country in Africa") as supported. The text verification system causes the electronic reading software to augment the target electronic document by displaying the verification indicator (e.g., "Verified") next to the target text segment.

While existing FEVER systems can determine the veracity of complex statements involving multiple sentences of evidence from a text corpus, the existing FEVER systems are burdensome to network resources because these systems retrieve a large amount of evidence a reasoning model to process. For example, certain existing FEVER systems unconditionally perform evidence retrieval for direct evidence and indirect evidence to support or refute a statement. Unconditionally performing evidence retrieval for direct evidence and indirect evidence creates a large data set of sentences that increases the processing time needed to generate a result. The implementations described in the present disclosure, however, provide a technical improvement by reducing the amount of evidence and the processing time needed to determine the veracity of the target text segment. In particular, the lazy retrieval protocol, in which the two-stage evidence selection model retrieves indirect evidence (e.g., second-stage evidence) only if the specialized reasoning model is unable to classify the veracity of the target text segment given the first-stage evidence, provides a specific improvement to the operation of network resources by reducing the amount of indirect evidence that is processed, which in turn, improves the processing time for determining the veracity of a target text segment.

FIG. 1 depicts an example of a computing environment for performing evidence retrieval and verification functionality, according to some aspects of the present disclosure. In this example, FIG. 1 illustrates a document display system 100. Document display system 100 includes any suitable computer system including, for example, server computer 805 of FIG. 8 and/or computing device 900 of FIG. 9. User system 135 is any suitable computer system including, for example, any of user devices 825a-c of FIG. 8 and/or computing device 900 of FIG. 9. A user may utilize user system 135 to access the document display system 100 via user interface (UI) subsystem 140.

In certain implementations, the document display system 100 provides an electronic document reader 105 that incorporates a text verification system 110 for providing the evidence retrieval and verification functionality for target text segments included in target electronic documents. The evidence retrieval and verification functionality includes machine-learning techniques for displaying, transforming, or otherwise processing electronic documents. In certain implementations, document display system 100 provides users with electronic reading functionality, including providing the capability to display and edit electronic documents, for example, regarding the size, shape, presence of an object or text, color, or any other attribute of an electronic document or portion of an electronic document.

Electronic document reader 105 may be implemented using software, hardware, firmware, or any combination thereof. In some implementations, the electronic document reader 105 includes UI subsystem 140 that communicates with a user system 135 operated by a user. The electronic document reader 105 also includes the text verification system 110 for performing some or all of the electronic document reader 105 functionality (e.g., automatically determining the veracity of a target text segment, as described herein).

Text verification system 110 determines the veracity metric of a displayed text segment (e.g., a target text segment) by selecting one or more text segments displayed within the electronic document (e.g., the target text segment) and initiating a process for determining the veracity metric of the selected text segments. Examples of such evidence retrieval and verification functionality are described in more detail with respect to FIGS. 5 and 7.

In some implementations, the text verification system 110 includes a document retrieval system 115, a two-stage evidence selection system 120, and a specialized reasoning model 125. The document retrieval system 115 identifies a subset of electronic documents from amongst the set of electronic documents included in the text corpus stored in the electronic document database 130. For example, the document retrieval system 115 determines whether the electronic document is relevant to a given target text segment, and if so, then the document retrieval system 115 includes the electronic document in the subset of electronic documents (e.g., as documents relevant to the target text segment). In some implementations, the document retrieval system 115 performs a named entity recognition on the target text segment to extract one or more potential entities included in the target text segment. The document retrieval system 115 then performs an indexed search of each electronic document included in the text corpus using the one or more potential entities. The electronic documents that result from the indexed search are relevant to the target text segment. For example, an entity is a described concept, such as physical objects (e.g., a group of people, an individual person, or an inanimate object, such as a beach ball) or abstractions (e.g., feeling happy). Entities are represented in text by name, indicated by a noun or noun phrase, or represented by a pronoun.

The two-stage evidence selection system 120 performs evidence retrieval from the subset of electronic documents using the lazy retrieval protocol. The lazy retrieval protocol includes a first stage and a conditional second stage. During the first stage, the two-stage evidence selection system 120 evaluates the various text segments (e.g., sentences) included in each electronic document of the subset of electronic documents, and retrieves first-stage evidence that is directly relevant to the target text segment. The specialized reasoning model 125 classifies the veracity of the target text segment given the first-stage evidence. For example, the classifications are supported by the first-stage evidence, refuted by the first-stage evidence, or undetermined because the first-stage evidence lacks information to support or refute the target text segment. If the specialized reasoning model 125 classifies the veracity of the target text segment as supporting or refuting the target text segment, then the text verification system 110 generates a verification indicator representing the classification. The text verification system 110 also augments the displayed target electronic document to display the verification indicator in association with the displayed target text segment.

The lazy retrieval protocol proceeds to the conditional second stage of evidence retrieval if the specialized reasoning model 125 classifies the veracity of the target text segment, given the first-stage evidence, as undetermined. During the second stage, the two-stage evidence selection system 120 retrieves evidence text segments (from the subset of electronic documents) that are indirectly relevant to the target text segment. The two-stage evidence selection system 120 transmits the second-stage evidence to the specialized reasoning model 125. The specialized reasoning model 125 performs textual entailment between the target text segment and a combination of the first-stage evidence and the second-stage evidence. The specialized reasoning model classifies the veracity of the target text segment based on the results of the textual entailment. For example, the groups of categories for classification include "supported" (e.g., by the second-stage evidence in context with the first-stage evidence), "refuted" (e.g., by the second-stage evidence in context with the first-stage evidence), or "undetermined" because the combination of the first-stage evidence and the second stage evidence lacks information to support or refute the target text segment.

To illustrate the text verification system 110 in use, and only as a non-limiting example, a user operates the user system 135 to load the electronic document reader 105. The user selects a target text segment from a target electronic document (indicated by arrow 145), and then triggers the evidence retrieval and verification functionality provided by the electronic document reader 105 (indicated by arrow 150) using a user interface that is displayed or provided on user system 135. Other communications may be transmitted or received indicated by arrow 150. The UI subsystem 140 receives the selection of the target text segment and the indication to execute the evidence retrieval and verification functionality. The UI subsystem 140 transmits the target text segment to the text verification system 110 as an input. The document retrieval system 115 can select a subset of electronic documents from the set of electronic documents stored in electronic document database 130, such that the subset of electronic documents are determined to be relevant to the target text segment. The document retrieval system 115 transmits the subset of electronic documents (or identifiers thereof) to the two-stage evidence selection system 120 (as indicated by arrow 170). The two-stage evidence selection system 120 extracts first-stage text segments (e.g., text segments retrieved during the first stage of evidence retrieval) and transmits the first-stage text segments to the specialized reasoning model 125 (as indicated by arrow 180). The specialized reasoning model 125 is unable to classify the first-stage text segments as supporting or refuting the target text segment. The classification of "not enough information" is transmitted from the specialized reasoning model 125 back to the two-stage evidence selection system 120 (as indicated by arrow 185). The two-stage evidence selection system 120 then proceeds to the conditional second stage and extracts second-stage text segments based on the first-stage text segments. Extracting the second-stage text segments based on the first-stage text segments includes searching through the set of electronic documents using the first-stage text segments as a target and identifying electronic documents that may be relevant. The text segments from these documents are inputted back into the two-stage evidence selection system 120 to identify the second-stage text segments. To illustrate and only as a non-limiting example, the first-stage text segment of "He won two Emmy Awards for his performances in Winchell and Monk" is retrieved from Stanley Tucci's Wikipedia page, however, the second-stage text segment of "Monk is an American comedy-drama detective mystery television series" is retrieved from the Wikipedia page of the TV show "Monk". The two-stage evidence selection system 120 transmits the second-stage text segments to the specialized reasoning model 125. The specialized reasoning model 125 performs joint evidence reasoning to classify the first-stage text segments and second-stage text segments as supporting or refuting the target text segment. The specialized reasoning model 125 generates a verification indicator representing the classification and augments the target electronic document displayed using UI subsystem 140 (as indicated by arrow 195).

While only three components are depicted in the text verification system of FIG. 1 (e.g., the document retrieval system 115, the two-stage evidence selection system 120, and the specialized reasoning model 125), the text verification system 110 includes any number of components or neural network layers in a pipeline.

Figure 2:
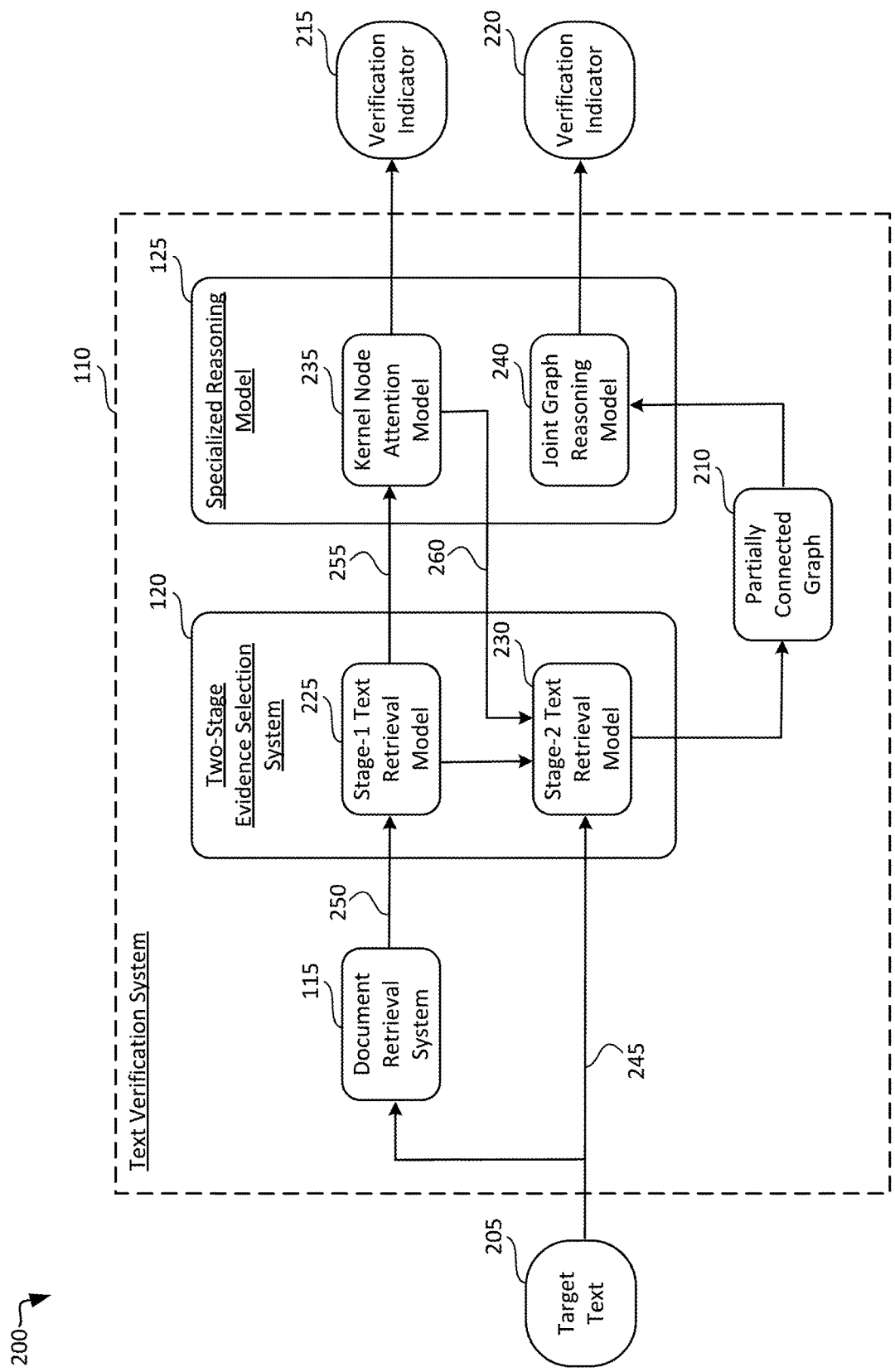
FIG. 2 depicts an example of a text verification system for determining the veracity of a target text segment, according to some aspects of the present disclosure.

FIG. 2 depicts an example of the text verification system 110 for determining the veracity of a target text segment, according to some aspects of the present disclosure. The text verification system 110 in this example generates a verification indicator (e.g., verification indicator 215 or 220) in response to receiving a target text segment 205 as an input. The verification indicators 215 or 220 represent the specialized reasoning model 125 inferring the veracity of the target text segment 205 given first-stage evidence or given a combination of first-stage evidence and second-stage evidence. Similar to the illustration of text verification system 110 in FIG. 1, the text verification system 110 shown in FIG. 2 also includes the document retrieval system 115, the two-stage evidence selection system 120, and the specialized reasoning model 125.

The target text segment is transmitted to the document retrieval system 115. The document retrieval system 115 identifies a group of electronic documents (from the text corpus) that are relevant to the target text segment 205. In some implementations, the document retrieval system 115 performs an entity-based recognition technique on the target text segment 205 to identify one or more potential entities described by the target text segment 205. The document retrieval system 115 then performs an index-based search of the electronic documents of the text corpus to identify which electronic documents are "relevant" to the target text system 115. An electronic document is determined to be relevant if the result of the index-based search indicates that the electronic document includes text representing the potential entities. The subset of electronic documents (or identifiers thereof) that the document retrieval system 115 identified as being relevant to the target text segment is transmitted to the two-stage evidence selection system 120 (as indicated by arrow 250).

The two-stage evidence selection system 120 includes a stage-1 text retrieval model 225 and a stage-2 text retrieval model 230. In some implementations, the stage-1 text retrieval model is a trained BERT model that receives as input each text segment of the subset of electronic documents and generates as an output a relevance score indicating a relevance between the text segment and the target text segment 205. As a non-limiting example, the stage-1 text retrieval model 225 selects, for example, the text segments associated with the top five relevance scores as the first-stage evidence. Similarly, the stage-2 text retrieval model 230 is also a trained BERT model that generates a relevance score. The stage-1 text retrieval model 225 and the stage-2 text retrieval model 230 are each trained individually using different techniques, described below.

In some implementations, training the stage-1 text retrieval model 225 includes training a BERT model to identify text segments that could individually support or refute the target text segment (e.g., without needing the context of a different text segment, or in other words, text segments that support or refute the given target text segment on their own). Evidence text segments that directly support or refute a given target text segment are labeled as positive examples. After the positive examples are labeled, the remaining text segments of the subset of electronic documents are labeled as negative examples (e.g., negative examples are text segments that are not retrieved as evidence for supporting or refuting the target text segment). As a non-limiting example, the input to the stage-1 text retrieval model 225 for training purposes is "'[CLS]'+claim+'[SEP]' +page title+':'+evidence sentence+'[SEP]'". In this example, the term "[CLS]" is the BERT classification token. The term [SEP] informs the BERT model that a new sentence is starting. The BERT model is a pre-trained model using the format "[CLS] Sentence A [SEP] Sentence B [SEP]." The BERT model can detect whether there are any patterns or correlations between Sentence A and Sentence B.

For example, in the training code line above, the BERT model can detect whether there are any correlations between the "claim" (e.g., the target text segment) and the "evidence sentence." Further, a hinge loss function is used for sentence selection to maximize a margin between positive and negative examples.

To train the stage-2 text retrieval model 230, a dataset of target text segments is created, such that each target text segment in the dataset requires multiple sentences of evidence to support or refute the target text segment (e.g., multiple sentences or phrases that could be used as evidence to support or refute the target text segment, as the "Ryan Gosling" example described above) is labeled as positive examples. Electronic documents of the text corpus from which first-stage evidence is retrieved are labeled as negative samples. Text segments that are not included in the evidence set (e.g., the text segments retrieved for the purpose of determining the veracity of a target text segment) are sampled from these documents. As a non-limiting example, the input to the second-stage BERT model (for the purpose of training the second-stage BERT model) is "'[CLS]'+claim+page title_1+evidence_sentence_1+'[SEP]'+page_title_2+':'+evidence sentence_2+'[SEP]'". Accordingly, in this example, the BERT model determines whether there are any patterns or correlations between "claim+page title_1+evidence_sentence_1" and "page_title_2+':'+evidence sentence_2."

At the time of inference (e.g., after both the stage-1 text retrieval model 225 and the stage-2 text retrieval model 230 have been trained), the two-stage evidence selection system 120 passes each text segment included in the subset of electronic documents through the stage-1 text retrieval model 225. The stage-1 text retrieval model 225 generates, as an output, a relevance score for each inputted text segment. The relevance score represents a degree to which the associated text segment is relevant to the target text segment. As a non-limiting example, the text segments associated with the top five relevance scores can be selected for retrieval. If the lazy retrieval protocol proceeds to the conditional second-stage of evidence selection, then the electronic documents from which the first-stage evidence was extracted are inputted into the stage-2 text retrieval model 230. Similar to the stage-1 text retrieval model 225, the stage-2 text retrieval model 230 generates, as an output, a relevance score for each inputted text segment. As a non-limiting example, the text segments associated with the top three relevance scores are selected for retrieval. These five text segments (in the case of first-stage only evidence retrieval) or eight text segments (if the second-stage evidence retrieval is triggered) are passed to the specialized reasoning model 125 for first- or second-stage reasoning, respectively.

The first-stage evidence is transmitted to the kernel node attention model 235 of the specialized reasoning model 125 (as indicated by arrow 255). During the first stage of reasoning, the specialized reasoning model 125 reasons over the first-stage evidence and the target text segment to infer the veracity of the target text segment, given the first-stage evidence. As described in greater detail with respect to FIG. 3, the kernel node attention model 235 is a sub-tree attention network that generates an evidence graph to represent the first-stage evidence or the second-stage evidence, and then reasons over the evidence graph and the target text segment to classify the veracity of the target text segment. If the kernel node attention model 235 classifies the veracity of the target text segment as supporting or refuting the target text segment 205, then the text verification system 110 generates the verification indicator 215 to represent the classification. The verification indicator 215 is used to augment the target electronic document to display the inferred veracity of the target text segment 205. If, however, the kernel node attention model 235 classifies the veracity of the target text as undetermined given a lack of information in the first-stage evidence to either support or refute the target text segment 205, then the specialized reasoning model 125 transmits the classification to the stage-2 text retrieval model 230 for retrieving second-stage evidence (as indicated by arrow 260). The joint reasoning graph model 240 reasons over target text segment 205 and the combined first-stage evidence and the second-stage evidence to generate an inference as to the veracity of the target text segment 205. The joint reasoning graph model 240 is described in greater detail with respect to FIG. 4.

Figure 3:
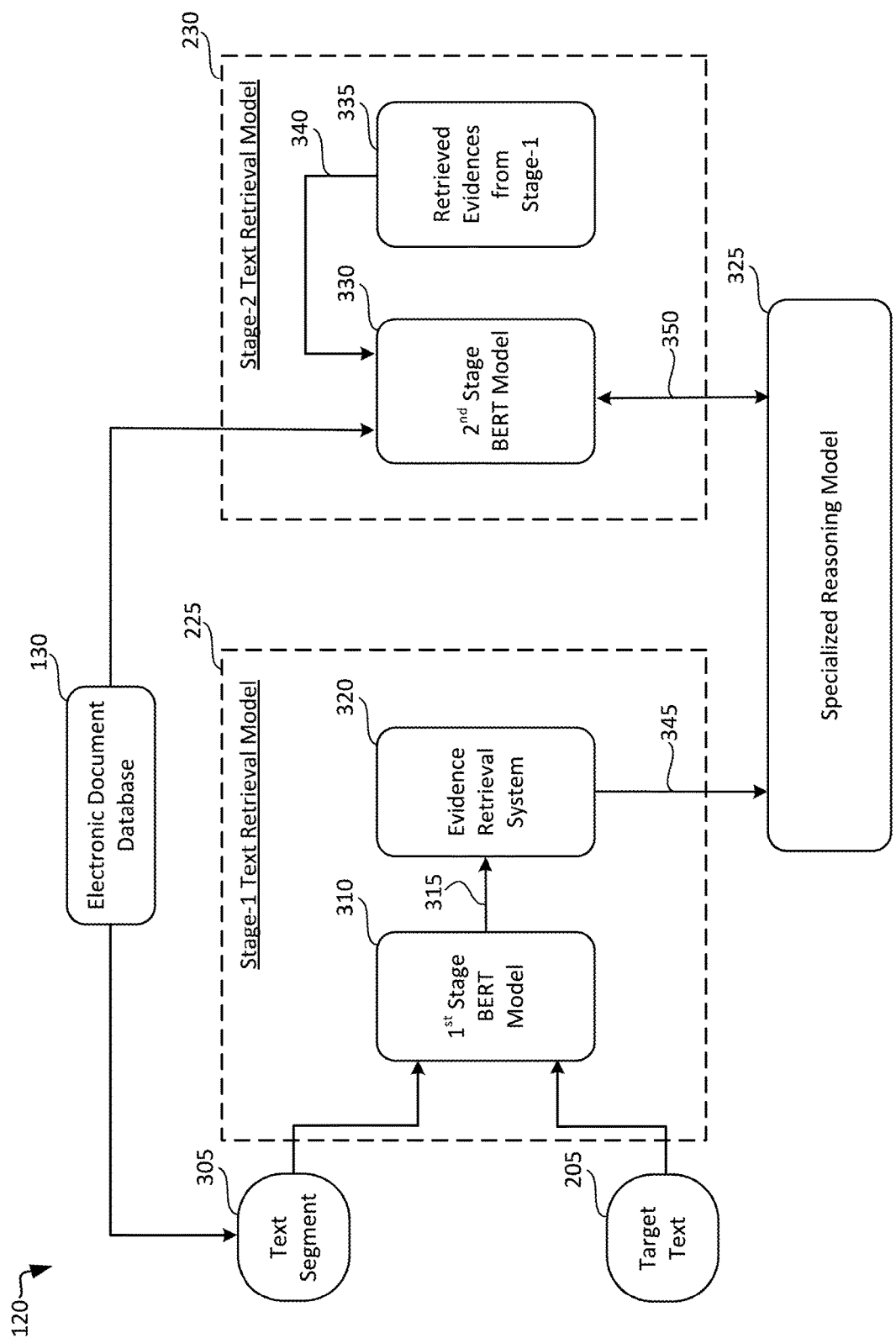
FIG. 3 depicts an example of multi-stage text retrieval model for selecting text segments from electronic documents to support or refute a target text segment, according to some aspects of the present disclosure.

FIG. 3 depicts an example of the two-stage evidence selection system 120 for selecting text segments from electronic documents to support or refute a target text segment, according to some aspects of the present disclosure. The two-stage evidence selection system 120 in this example retrieves first-stage evidence from a text corpus, and conditionally retrieves second-stage evidence from certain electronic documents of the text corpus. As illustrated in FIG. 3, the two-stage evidence selection system 120 includes a stage-1 text retrieval model 225 and a stage-2 text retrieval model 230.

In some implementations, stage-1 text retrieval model 225 includes first-stage BERT model 310 and evidence retrieval system 320. The first-stage BERT model 310 is a pre-trained machine-learning network for performing natural language processing (NLP) tasks. The first-stage BERT model 310 is trained to detect the meaning of unlabeled text by using nearby text to determine contextual information. For example, the first-stage BERT model 310 is pre-trained using text from WIKIPEDIA and can be further fine-tuned. The first-stage BERT model 310 is trained using the training techniques described with respect to FIG. 2.

In some implementations, training the first-stage BERT model 310 includes labeling a set of target text segments (e.g., claims) as positive examples. Each target text segment of the set of target text segments requires retrieving a single text segment from the text corpus to support or refute the target text segment. The sentences that are not used to directly support or refute each target text segment of the set of target text segments are labeled as negative examples (e.g., negative examples are text segments that are not retrieved as evidence for supporting or refuting the target text segment). As a non-limiting example, during training, the input to the first-stage BERT model 310 is "'[CLS]'+claim+'[SEP]'+page title+':'+evidence sentence+'[SEP]'". Further, a hinge loss function is used for sentence selection to maximize a margin between positive and negative examples.

At the time of first-stage evidence retrieval in production (e.g., after the first-stage BERT model 310 has been trained), all of the text segments of the subset of electronic documents (yielded by the document retrieval system 115) stored in the electronic document database 130 are individually inputted into the first-stage BERT model 310. The first-stage BERT model 310 generates, as an output, a relevance score for each inputted text segment 305. The relevance score represents a degree to which the associated text segment is relevant to the target text segment 205. The evidence retrieval system 320 orders the text segments according to their associated relevance scores. As a non-limiting example, the evidence retrieval system 320 ranks all of the text segments included in the subset of electronic documents by their relevance score, identifies the top relevance scores and the associated text segments, and then retrieves or extracts the top five text segments as first-stage evidence (as indicated by arrow 315). The first-stage evidence is transmitted to the specialized reasoning model 325 for performing the first stage of reasoning, which generates a classification for each of the top five text segments included in the first-stage evidence. The classifications include supporting the target text segment 205, refuting the target text segment 205, or neither supporting nor refuting the target text segment 205 (e.g., a classification of "not enough information" to support or refute the target text segment 205). The classification is based on the combined score computed as the weighted combination of each of the five text segments. If the classification is supporting or refuting, then the two-stage evidence selection system 120 outputs the classification and does not use the stage-2 text retrieval model 230. If, however, the stage-1 text retrieval model 225 is unable to classify at least one first-stage text segment as either supporting the target text segment 205 or refuting the target text segment 205 (e.g., a classification of "not enough information" as indicated by arrow 345), then the two-stage evidence selection system 120 uses stage-2 text retrieval model 230 to retrieve second-stage evidence (e.g., sentences that are indirectly relevant to the target text segment 205), according to the lazy retrieval protocol.

In some implementations, the stage-2 text retrieval model 230 includes a second-stage BERT model 330. For training the second-stage BERT model 330, a dataset of target text segments is created, such that each target text segment requires multiple text segments (e.g., multiple sentences or phrases that serve as evidence) to support or refute the target text segment. Each target text segment included in the dataset is labeled as a positive example. Electronic documents of the text corpus from which the first-stage evidence was retrieved are labeled as negative samples. Training the stage-2 retrieval model 230 further includes sampling text segments that are not included in the evidence set (e.g., the text segments retrieved for the purpose of determining the veracity of a target text segment). As a non-limiting example, the input to the second-stage BERT model 230 (for the purpose of training the second-stage BERT model) is "'[CLS]'+claim+page title_1+evidence_sentence_1+'[SEP]'+page_title_2+':'+evidence sentence_2+'[SEP]'".

After the training of the stage-2 text retrieval model 230 is complete, if the lazy retrieval protocol proceeds to the conditional second-stage of evidence selection, then the electronic documents from which the first-stage text segments were extracted 335 are inputted into the stage-2 BERT model 330 (as indicated by arrow 330). The stage-2 BERT model 330 generates, as an output, a relevance score for each inputted text segment. As a non-limiting example, the text segments associated with the top three relevance scores are selected for retrieval. These five first-stage text segments (in the case of first-stage only evidence retrieval) and eight second-stage text segments (if the second-stage evidence retrieval is triggered) are passed to the specialized reasoning model 125 for performing the first and second stage reasoning, respectively.

The present disclosure is not limited to the use of two trained BERT models; namely the first-stage BERT model 310 and the stage-2 BERT model 330. Any number of trained BERT models may be implemented in as a multi-stage evidence selection system. The present disclosure is not limited to BERT models, and thus, other language models can be used.

Figure 4:
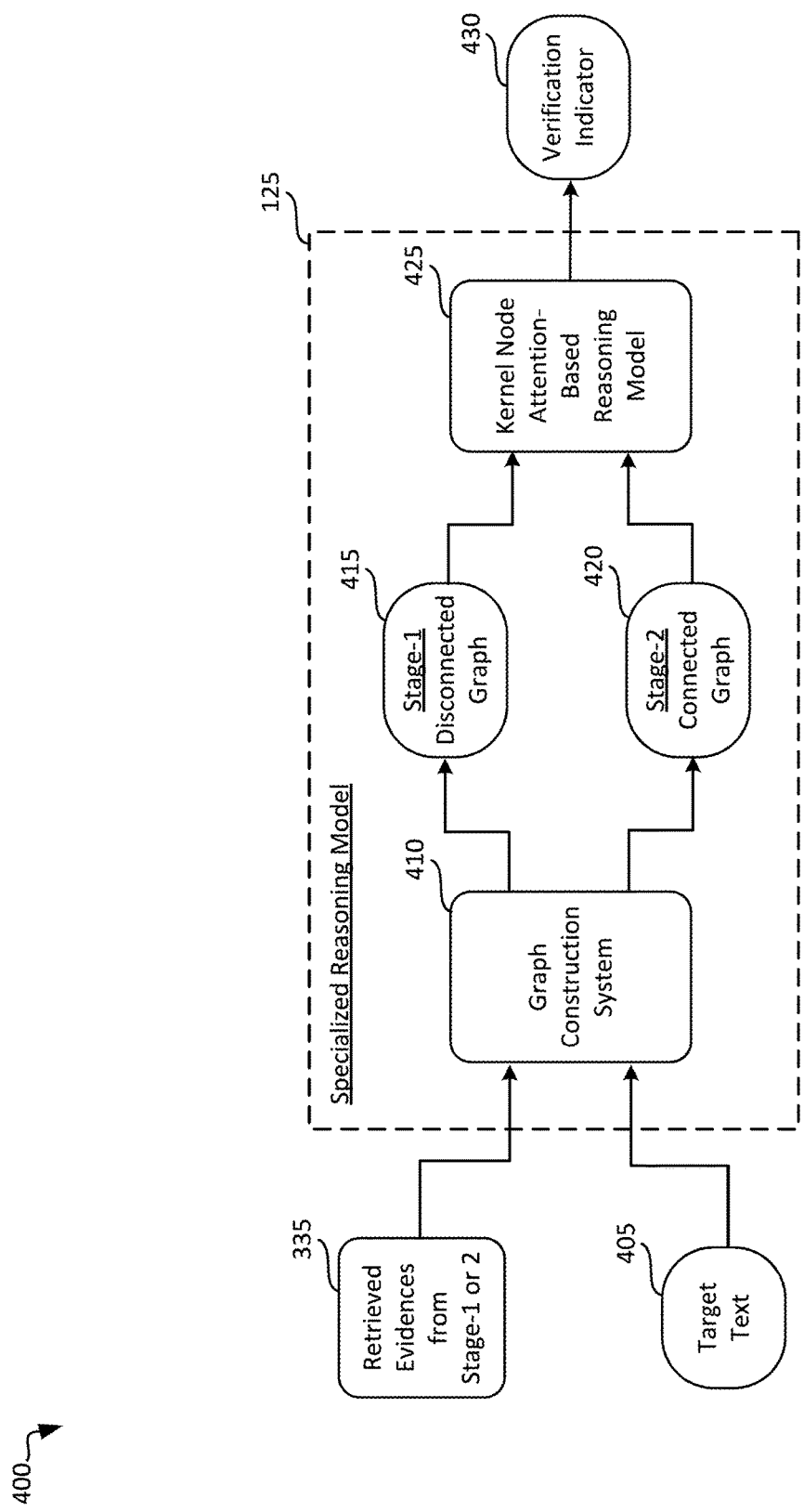
FIG. 4 depicts an example of a specialized reasoning model for generating inferences indicating whether text segments support or refute a target text segment, according to some aspects of the present disclosure.

FIG. 4 depicts an example of a specialized reasoning model 125 configured to classify text segments as supporting or refuting a target text segment 405, according to some aspects of the present disclosure. The specialized reasoning model 125 in this example is configured with two parts: a graph construction system 410 and a kernel node attention-based reasoning model 425. The graph construction system 410 constructs a stage-1 evidence graph 415 for the first stage of reasoning and a stage-2 evidence graph 420 for second stage reasoning. The first stage of reasoning refers to the stage at which the specialized reasoning model 125 reasons over the first-stage evidence. The second stage of reasoning refers to the stage at which the specialized reasoning model 125 reasons over the first-stage evidence and the second-stage evidence.

For the first stage of reasoning, the graph construction system 410 generates evidence graph 415. Evidence graph 415 includes a plurality of disconnected nodes. Each node represents the information associated with a text segment retrieved during the first-stage evidence retrieval. The nodes of evidence graph 415 are disconnected from each other, which means that during the first stage of reasoning when the kernel node attention-based reasoning model 425 reasons over the target text segment 405 and the first-stage evidence 335. Thus, during the first stage of reasoning, the specialized reasoning model 125 does not collate information from multiple text segments when reasoning over the target text segment. The evidence graph 415 does not include any connections between nodes because each evidence text segment included in the first-stage evidence could potentially support or refute the target text segment 405. Thus, each evidence text segment included in the first-stage evidence is selected so as to not need the context of another evidence text segment (e.g., another node) to support or refute the target text segment 405.

During the second stage of reasoning (e.g., when the kernel node attention-based reasoning model 425 reasons over first-stage evidence and the second-stage evidence combined), the graph construction system 410 generates the evidence graph 420, which is a partially connected set of nodes. The second-stage evidence includes evidence text segments that are indirectly relevant to the target text segment 405. Thus, each evidence text segment included in the second-stage evidence needs the context of another evidence text segment to support or refute the target text segment 405. Referring back to the "Ryan Gosling" example described above, the second-stage evidence included the sentence "Chad is a land-locked county in Central Africa," which is indirectly relevant to the target text segment ("Ryan Gosling has been to a country in Africa"). In this example, the sentence "Chad is a land-locked country in Central Africa" needs the context of the first-stage evidence "Ryan Gosling has traveled to Chad, Uganda, and eastern Congo" to support or refute the target text segment.

Connecting two or more nodes together in evidence graph 420 enables the kernel node attention-based reasoning model 425 to collate information between the connected nodes during the second stage of reasoning (which jointly reasons over the first-stage evidence and the second-stage evidence).

Connecting all of the nodes together collates all of the first-stage evidence and the second-stage evidence together when the kernel node attention-based reasoning model 425 reasons over the evidence graph 420. If all of the nodes are connected, however, the first-stage evidence and the second-stage evidence constitute all of the entities from the target text segment. Thus, kernel node attention-based reasoning model 425 will be more likely to classify the veracity of the target text segment as supported or refuted, even when the first-stage evidence and the second-stage evidence is insufficient to support or refute the target text segment. That is, when the kernel node attention-based reasoning model 425 reasons over a fully connected evidence graph, the entities included in each of the evidence text segments of the retrieved evidence are aggregated together, which overlooks the intricacies of individual combinations of evidence text segments and leads to the potential for misclassification as supported or refuted.

Certain implementations of the present disclosure address the potential for misclassification in a fully-connected graph by partially and selectively connecting nodes of the stage-2 evidence graph 420, rather than connecting all of the nodes together. In some implementations, determining which nodes to connect together, the graph construction system 410 identifies entities present in each node (e.g., each retrieved first-stage and second-stage text segment) of the stage-2 evidence graph 420, and then connects the nodes that have common entities between them. As a technical improvement, evidence graph 420 is partially connected, in that two or more nodes of the set of nodes are connected to each other, but not all nodes are connected to another node. Certain nodes may still be disconnected, which provides a technical improvement by reducing the processing time needed for the kernel node attention-based reasoning model 425 to perform the second stage reasoning.

Referring back to the "Ryan Gosling" example, the graph construction system 410 identifies that the first-stage evidence of "Ryan Gosling has traveled to Chad, Uganda, and eastern Congo" has the entity "Chad," and the second-stage evidence of "Chad is a land-locked country in Central Africa" also has the entity "Chad." The graph construction system 410 connects the node representing the first-stage evidence of "Ryan Gosling has traveled to Chad, Uganda, and eastern Congo" with the node representing the second-stage evidence of "Chad is a land-locked country in Central Africa." Thus, when the kernel node attention-based reasoning model 425 reasons over the partially connected evidence graph in this example, the kernel node attention-based reasoning model 425 will infer that the target text segment of "Ryan Gosling has been to a country in Africa" is supported by the combined first-stage and second-stage evidence.

During the first stage of reasoning, the kernel node attention-based reasoning model 425 performs a reasoning task over the stage-1 evidence graph 415 and the target text segment 405. During the second stage of reasoning, the kernel node attention-based reasoning model 425 performs the reasoning task over the partially connected stage-2 evidence graph 420. Further, the kernel node attention-based reasoning model 425 generates as an output a verification indicator 430, which represents the classification of the first-stage text segments or the joint classification of the first-stage and second-stage text segments.

The kernel node attention-based reasoning model 425 executes a reasoning task when reasoning over evidence graph 415 or evidence graph 420. Executing the reasoning task includes executing the following equations. The reasoning task involves building sub-trees of an evidence graph (e.g., evidence graph 415 or 420), where each node of the evidence graph is a root of the sub-tree. For instance, for a given node p of the evidence graph, the kernel node attention-based reasoning model 425 extracts one-hop nodes having a direct edge to that node p. The kernel node attention-based reasoning model 425 forms a sub-tree $G^p$ from the node p and the extracted one-hop nodes. The kernel node attention-based reasoning model 425 generates a node encoding $n^p$, which numerically represents the evidence text segment associated with node p. $n^p$ is generated by passing the input "[CLS]+claim+[SEP]+evidence text segment associated with node p+[SEP]" through the trained BERT model (e.g., the first-stage BERT model for first-stage reasoning and the second-stage BERT model for second-stage reasoning). The output is used as the value for $n^p$.

The kernel node attention-based reasoning model 425 then generates an information propagation term, $z^{q \rightarrow p}$, by computing an attention-based weighted average over the nodes, $n^q$, that are one-hop away from node p. Then, the kernel node attention-based reasoning model 425 can generate a sub-tree representation, $a^p$, to numerically represent each sub-tree $G^p$. The following equation is used to generate the sub-tree representation $a^p$:

$$a^p = \Sigma_{q,p \in \xi} \beta^{q \rightarrow p} * z^{q \rightarrow p}, \quad \text{(Equation 1)},$$

where $\xi$ represents the set of edges in the evidence graph, $z^{q \rightarrow p}$ represents the information that is propagated from $n^q$ to $n^p$, and $\beta^{q \rightarrow p}$ is the attention weight of $n^q$ with respect to $n^p$.

The kernel node attention-based reasoning model 425 reasons over the evidence graph by identifying a current node of the evidence graph and generating an updated representation for the current node, $v^p$, by concatenating $a^p$ with the initial root representation, $z^p$, using the following equation:

$$v^p = a^p \circ z^p, \quad \text{(Equation 2)},$$

where "[CLS]" is used as the initial root representation $z^p$.

Using the updated representation, $v^p$, for each node in the evidence graph, the kernel node attention-based reasoning model 425 computes a probability distribution $P(y|n^p, G^p)$ over various labels y given $G^p$ and $n^p$. For instance, the kernel node attention-based reasoning model 425 computes $P(y|n^p, G^p)$ as $$P(y|n^p, G^p) = \text{softmax}_y(\text{Linear}(v^p)), \quad \text{(Equation 3)}$$

The kernel node attention-based reasoning model 425 generates a composite representation, $\phi(n^p)$, which is used determine the importance of node p as compared to other nodes, such as node q, of the evidence graph. To illustrate, for the target text element "Stanley Tucci performed in a television series," the first-stage evidence of "Monk is an American comedy-drama detective mystery television series" may be ranked low if only the updated representation, $v^p$ is considered. However, the composite representation, $\phi(n^p)$, contains additional information about node p's relationship with another node q, "He won two Emmy Awards for his performances in Winchell and Monk", which is used to interpret the importance of node p. The composite representation is calculated using the following equation $$\phi(n^p) = n^p \circ a^p, \quad \text{(Equation 4)}$$

The kernel node attention-based reasoning model 425 assigns an importance order to the nodes in the presence of the context information of the current node with respect to its connected nodes, as opposed to taking the context solely from the target text segment. For instance, the kernel node attention-based reasoning model 425 calculates, with the following equation, a probability distribution $P(n^p|G)$ of a particular node $n^p$ for a tree G:

$$P(n^p|G) = \text{softmax}_y(MLP(\phi(n^p))), \quad \text{(Equation 5)}$$

The kernel node attention-based reasoning model 425 determines the importance order from the probability distribution P($n^p$|G) by ranking the resulting probability distribution for each node p of the evidence graph.

The kernel node attention-based reasoning model 425 also performs a joint graph reasoning of the first-stage evidence and the second-stage evidence. For example, the specialized reasoning model 125 generates a combined label prediction probability P for a particular label y as given below, $$P(y|G) = \Sigma_{p=1}^{l} p(y|n^p, G^p) P(n^p|G), \quad \text{(Equation 6)}$$

Equations 1 through 6 are calculated in order to determine a probability of selecting each node in an evidence graph. Selecting a node refers to selecting an evidence text segment from amongst the top five evidence text segments retrieved during the first stage of retrieval or from amongst the top eight during the second stage of retrieval. Further, text verification system 110 selects the node by minimizing a cross entropy loss (e.g., the node associated with the minimum cross entropy loss is selected as the evidence text segments that supports or refutes the target text segment). The kernel node attention-based reasoning model 425 calculates the cross entropy loss associated with each node p, using the following equation:

$$\mathcal{L} = \text{CrossEntropy}(y^* P(y|G)) + \text{BinaryCrossEntropy}(n^*, p^*), \quad \text{(Equation 7)}$$

In Equation 7, a cross entropy loss CrossEntropy indicates a difference between a predicted label y and a ground truth label y*, where y* is the one-hot three-dimensional vector for the ground truth label and P(y|G) is the predicted probability over the three classes (e.g., supported, refuted, and "not enough information"). Furthermore, a binary cross entropy loss BinaryCrossEntropy indicates a difference between the predicted evidence p* and the ground truth evidence n*. The ground truth evidence term n* is a multi-dimensional vector (e.g., eight dimensions) with elements {0,1}, where 1 represents a true evidence, and 0 otherwise. The multi-dimensional vector can have multiple elements representing a true evidence. As an illustrative example, both "He won two Emmy Awards for his performances in Winchell and Monk" and "Monk is an American comedy-drama detective mystery television series" will have 1 in the ground truth multi-dimensional vector. The predicted evidence p* is computed as:

$$p^* = \{P(n_i^*|G) | i \in \{1,8\}\}, \quad \text{(Equation 8)}$$

In Equation 8, P($n_i$|G) is the probability of node $n_i$ being an evidence node. The binary cross entropy loss term in the loss function $\mathcal{L}$ provides a feedback on correct evidence, which improves the importance probability hence increasing the weight of label prediction during combining predictions from all nodes, and consequently enhances the label accuracy.

Figure 5:
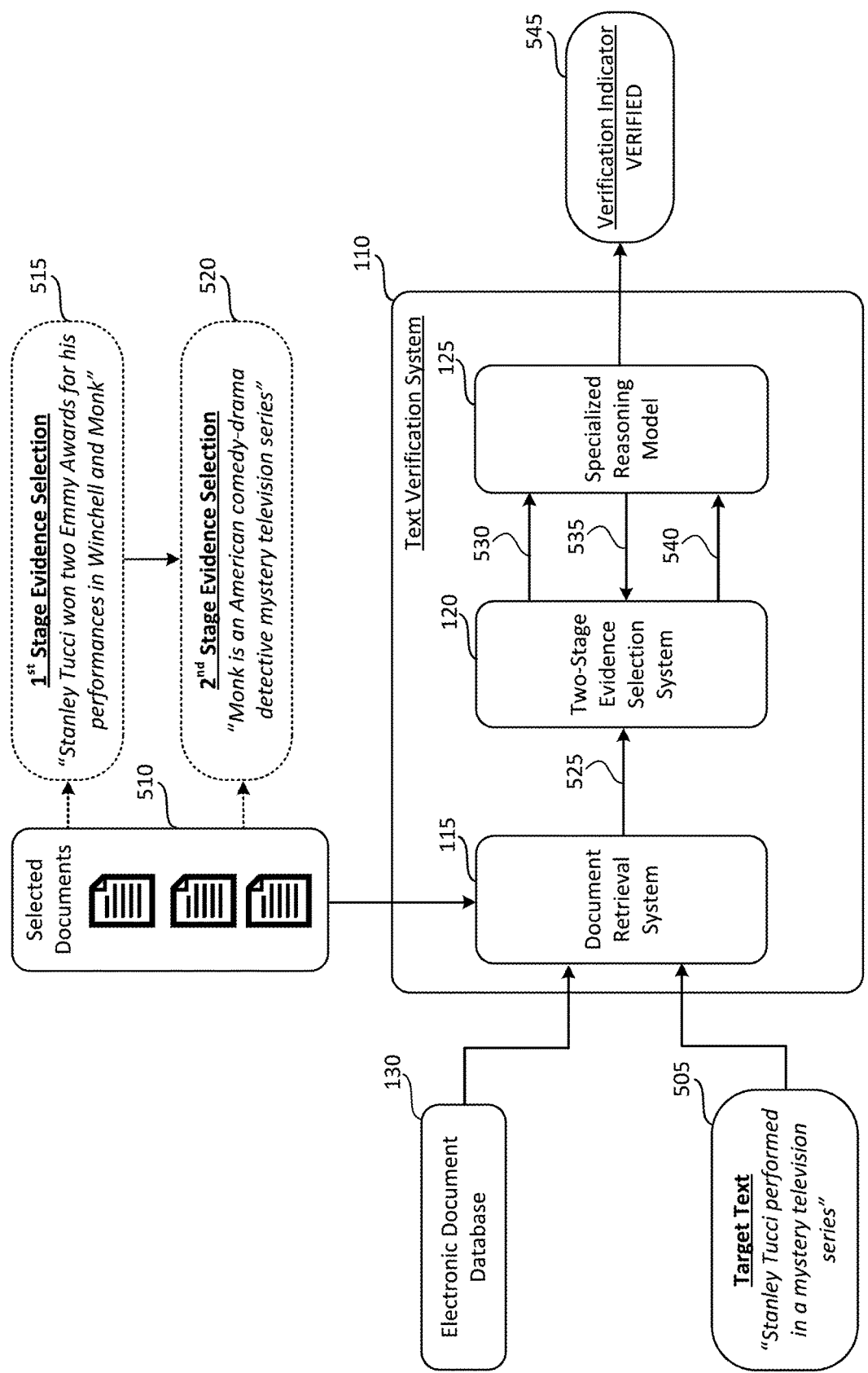
FIG. 5 depicts an example of using a text verification system to generate a verification indicator representing the inferred veracity of a target text segment, according to some aspects of the present disclosure.

FIG. 5 depicts an example 500 of using a text verification system to generate a verification indicator representing the inferred veracity of a target text segment, according to some aspects of the present disclosure. The target text segment 505 is "Stanley Tucci performed in a mystery television series." That is, a user operates the electronic document reader 105 by selecting the target text segment 505 displayed on a target electronic document and triggering the evidence retrieval and verification functionality provided by the electronic document reader 105.

The document retrieval system 115 receives the target text segment 505 and performed an entity-based search to identify the potential entities described in the target text segment 505. The document retrieval system 115 performs an index-based search of all of the electronic documents stored in electronic document database 130 to identify selected documents 510, from which the evidence will be retrieved. The document retrieval system 115 determines the selected documents 510 as being relevant to the target text segment 505. The document retrieval system 115 transmits the selected documents 510 to the two-stage evidence selection system 120 (as indicated by arrow 525).

During the first stage of evidence retrieval, the first-stage BERT model of the two-stage evidence selection system 120 individually receives as input each text segment from the selected documents 510. The first-stage BERT model generates a relevance score for each inputted text segment. The text segment 515 is selected for first-stage evidence retrieval because the text segment had the highest relevance score, as outputted by the first-stage BERT model of the two-stage evidence selection system 120. For example, the text segment 515 includes the text "Stanley Tucci won two Emmy Awards for his performances in Winchell and Monk." The two-stage evidence selection system transmits the text segment 515 to the specialized reasoning model 125 to perform the reasoning task (as indicated by arrow 530).

The specialized reasoning model 125 generates a stage-1 evidence graph for the text segment 515 and any other text segments that were retrieved during the first stage of evidence retrieval. The stage-1 evidence graph is a disconnected graph, in that none of the nodes of the evidence graph is connected to another node. One of the nodes of the stage-1 evidence graph represents the text segment 515. The kernel node attention-based reasoning model of the specialized reasoning model 125 evaluates the stage-1 evidence graph and the target text segment 505 to classify the text segment 515 as supporting the target text segment 505, refuting the target text segment 505, or not providing sufficient information to support or refute the target text segment 505. While text segment 515 uses the term "Stanley Tucci" and "Monk," text segment 515 on its own does not support or refute the target text segment 505 because text segment 515 does not describe the television show "Monk" as being a "mystery television series." Thus, the specialized reasoning model 125 classifies the text segment 515 as not providing sufficient information to support or refute the target text segment 505 (as indicated by arrow 535).

Given that the specialized reasoning model 125 was unable to classify the text segment 515 as supporting the target text segment 505 or refuting the target text segment 505, the two-stage evidence selection system 120 proceeds to the conditional second-stage evidence retrieval due to the lazy retrieval protocol. Extracting the second-stage text segments based on the first-stage text segments includes searching through the set of electronic documents using the first-stage text segments as a target and identifying electronic documents that may be relevant. The text segments from these documents are inputted into the second-stage BERT model to generate a relevance score used to select the second-stage text segment. The second-stage BERT model generates a relevance score for each inputted text segment. The text segment 520 is identified as being associated with the highest relevance score as outputted by the second-stage BERT model, and thus, text segment 520 is retrieved during the second stage of evidence retrieval. The text segment 520 is a sentence that states "Monk is an American comedy-drama detective mystery television series." The two-stage evidence selection system 120 transmits the text segment 520 to the specialized reasoning model 125 to be jointly reasoned over together with text segment 515.

The specialized reasoning model 125 generates a stage-2 evidence graph representing both the text segment 515 and the text segment 520. The stage-2 evidence graph is a partially connected graph, such that at least two nodes are connected to collate the information from the two nodes. The specialized reasoning model 125 determines that the node representing the text segment 515 is to be connected with the node representing the text segment 520 because both nodes include the same entity (e.g., the entity of "Monk."). The kernel node attention-based reasoning model reasons over the stage-2 evidence graph and the target text segment to infer whether the text segment 515 and the text segment 520 together are classified as supporting or refuting the target text segment 505. The kernel node attention-based reasoning model automatically determines that the text segment 515 together with the text segment 520 is classified as supporting the target text segment. For example, the fact that Stanley Tucci won an Emmy for his performance in Monk, combined with the fact that Monk is a mystery television series supports the target text segment 505 that read "Stanley Tucci performed in a mystery television series." Therefore, the specialized reasoning model 125 generates a verification indicator 545, indicating that the veracity of the target text segment 505 has been verified.

Figure 6:
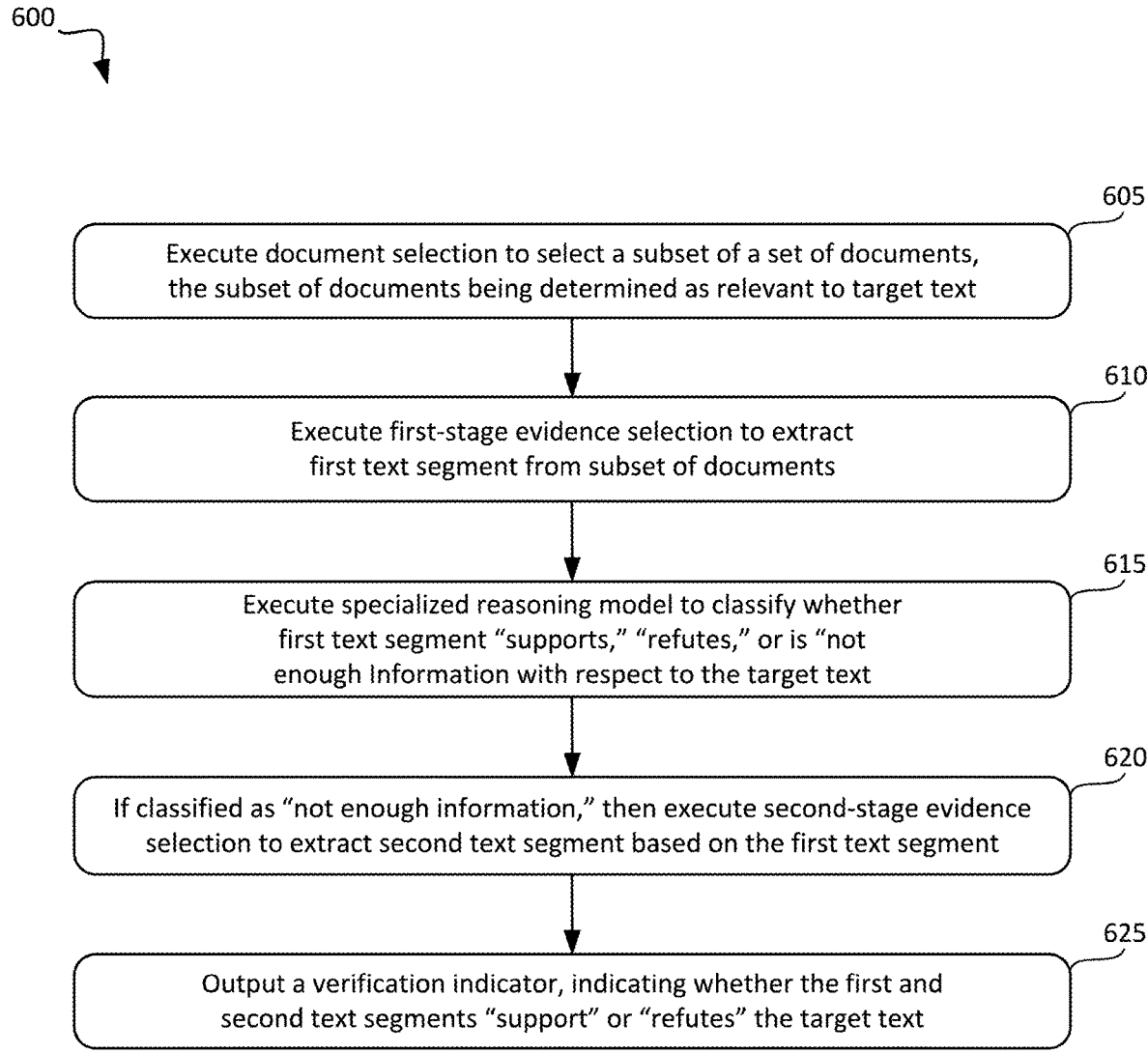
FIG. 6 depicts an example of a process for determining the veracity of a target text segment using a corpus of electronic documents, according to some aspects of the present disclosure.

FIG. 6 depicts an example of a process 600 for using a text verification system to automatically infer the veracity of a target text segment, according to some aspects of the present disclosure. Process 600 is performed at least in part by any of the hardware-based computing devices illustrated in FIGS. 1-5 or FIGS. 8-9. For example, process 600 is performed by one or more servers included in the document display system 100, the electronic document reader 105, or the text verification system 110. As a further example, the text verification system 110 performs process 600 as part of fact extraction and verification functionality, such as determining the veracity of a target text segment selected based on input received from a user device.

At block 605, the text verification system 110 receives input (e.g., from user system 135) corresponding to a selection of a target text segment. The target text segment is included in a target electronic document that is displayed by electronic document reader 105. For example, the target text segment is selected if a user who is viewing the target electronic document seeks to determine the veracity of the target text segment. The target text segment is any text displayed by the electronic document reader 105. An example of implementing block 605 is described above with respect to FIG. 1.

At block 610, the two-stage evidence selection system 120 performs a first stage of evidence retrieval, which includes retrieving first-stage evidence from the text corpus stored in electronic document database 130. The first-stage evidence refers to evidence text segments that are directly relevant to the target text segment. The two-stage evidence selection system 120 generates a relevance score for each text segment included in the text corpus. For example, the relevance score represents the relevance between the text segment that is being evaluated for retrieval and the target text segment. In some implementations, the text segments that are associated with the top five relevance scores are retrieved as first-stage evidence. An example of implementing block 610 is described above with respect to FIGS. 1, 2, and 3.

At block 615, the specialized reasoning model 125 classifies the veracity of the target text segment using the first-stage evidence retrieved at block 610 as supported by the first-stage evidence, refuted by the first-stage evidence, or undetermined. In some implementations, the specialized reasoning model 125 includes constructing an evidence graph, which graphically represents the first-stage evidence retrieved at block 610. The evidence graph includes a plurality of nodes. Each node represents, for example, one of the five text segments included in the first-stage evidence retrieved at block 610. Further, each node of the plurality of nodes is disconnected from any other node in the evidence graph during the first stage of reasoning. The evidence graph is disconnected at this first stage because the specialized reasoning model 125 determines whether each text segment of the first-stage evidence individually provides direct support (or not) for the target text segment. Additionally, the specialized reasoning model includes a kernel node attention-based reasoning model that is trained to classify the veracity of the target text segment. An example of implementing block 615 is described above with respect to FIGS. 4-5.

At block 620, the specialized reasoning model 125 classifies the veracity of the target text segment as undetermined. In response, the two-stage evidence selection system 120 proceeds to the second stage of evidence retrieval according to the lazy retrieval protocol. The second stage of evidence retrieval identifies text segments in the text corpus that are indirectly relevant to the target text segment. Indirect relevance indicates that the specialized reasoning model 125 infers that the second-stage evidence supports or refutes the target text segment only with the context of the first-stage evidence. An example of implementing block 620 is described above with respect to FIGS. 4-5.

At block 625, the specialized reasoning model 125 evaluates the target text segment using the first-stage evidence and the second-stage evidence. The second-stage evidence is retrieved based on the first-stage evidence because the first-stage evidence alone does not provide sufficient information to enable the specialized reasoning model 125 to classify the target text segment as "supported" or refuted." The specialized reasoning model 125 modifies the evidence graph by selectively connecting two or more nodes in the evidence graph. In some implementations, the two-stage evidence selection system 120 identifies the entities present in each retrieved text segment, and then connects the nodes that have common entities between them. The connected nodes are used to learn and update the representation of each node in the evidence graph. The output of the specialized reasoning model at stage two is a classification of whether the first and second text segments together support or refute the target text segment. An example of implementing block 625 is described above with respect to FIGS. 4-5.

Figure 7:
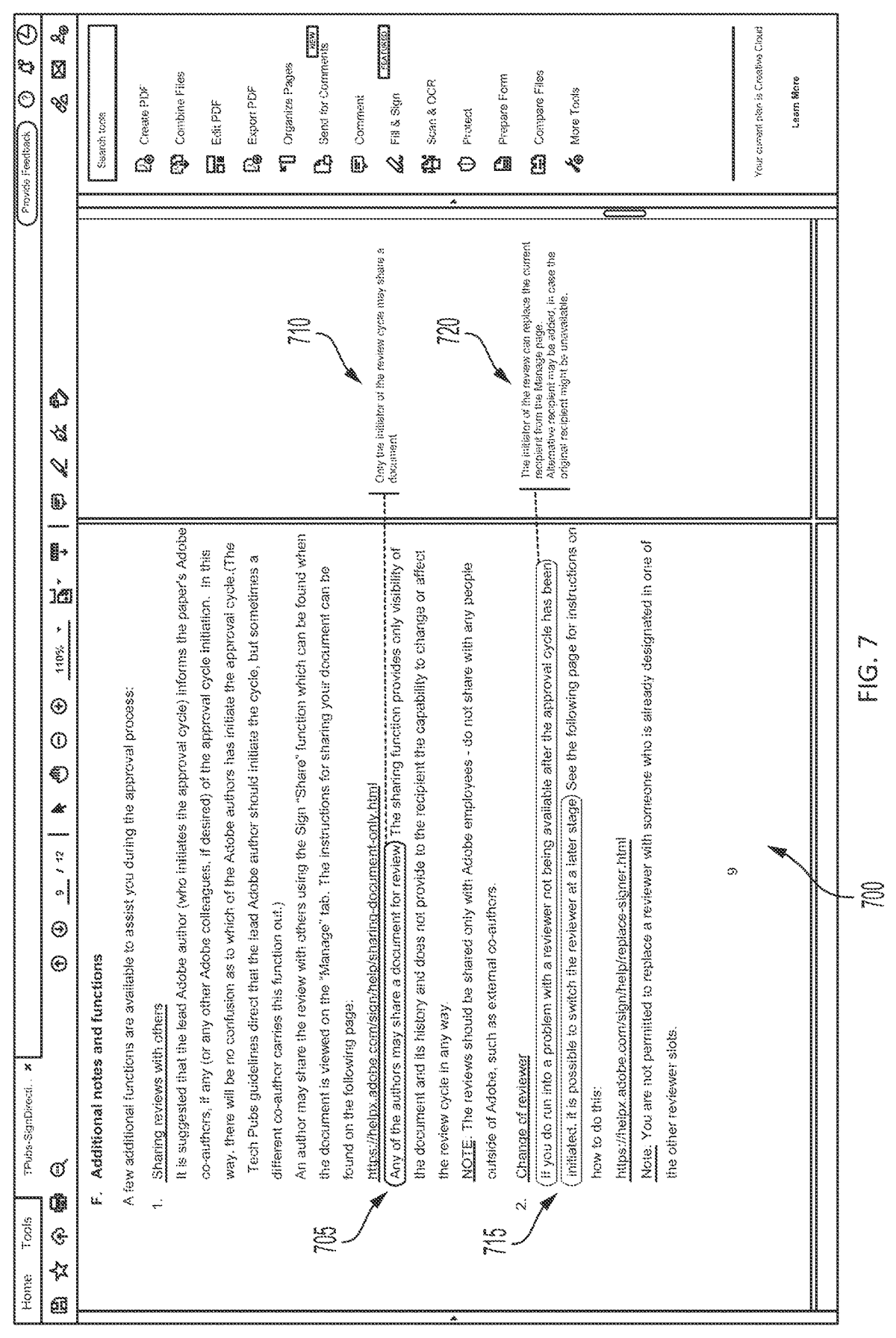

At block 630, the text verification system 110 generates a verification indicator representing the classification of block 620. The text verification system 110 can augment the target electronic document by adding the output of the specialized reasoning model (e.g., "supported" or "refuted") to the target electronic document adjacent or otherwise in association with the displayed target text. FIG. 7, for example, illustrates displaying the target text segment in association with the classification outputted by the specialized reasoning model. An example of implementing block 630 is described below with respect to FIG. 7.

FIG. 7 depicts an example of an output of process 600 as described with respect to FIG. 6. Electronic reading software (e.g., ADOBE READER) displays electronic documents on a display screen of a user device. The electronic reading software is further configured to include a text verification system (e.g., text verification system 110 as illustrated in FIG. 1) that is usable to augment a displayed electronic document with verification indicators. For example, a verification indicator represents an inferred veracity of a target text segment included in the electronic document.

To illustrate and only as a non-limiting example, the electronic reading software receives input (e.g., from a user device) corresponding to a selection of a target text segment, for which the veracity is to be determined. As illustrated in FIG. 7, target text segment 705 is selected based on input received from a user device. The electronic reading software receives another input, instructing the electronic reading software to execute the text verification system infer the veracity of target text segment 705 using the content of electronic documents stored in electronic document database 130. In response, the text verification system automatically retrieves various text segments from the content of the electronic documents stored in electronic documents database 130 and determines the veracity metric of target text segment 705 based on the retrieved text segments. The text verification system classifies target text segment 705 as being supported or refuted and augments target electronic document 700 with verification indicator 710. For example, as illustrated in FIG. 7, verification indicator 710 indicates that the text verification system classified target text segment 705 as "refuted" (e.g., "false" based on the content included in the electronic documents stored in electronic documents database 130).

Additionally, electronic reading software receives input corresponding to a selection of target text segment 715. The electronic reading software receives an additional input, instructing the electronic reading software to execute the text verification system to infer the veracity of text segment 715 using the electronic documents stored in electronic document database 130. In response, the text verification system determines the veracity of target text segment 715 and augments target electronic document 700 with verification indicator 720. For example, as illustrated in FIG. 7, verification indicator 720 indicates that the text verification system classified target text segment 715 as "supported" (e.g., "true" based on the content included in the electronic documents stored in electronic documents database 130).

Examples of Computing Environments for Implementing Certain Implementations

Figure 8:
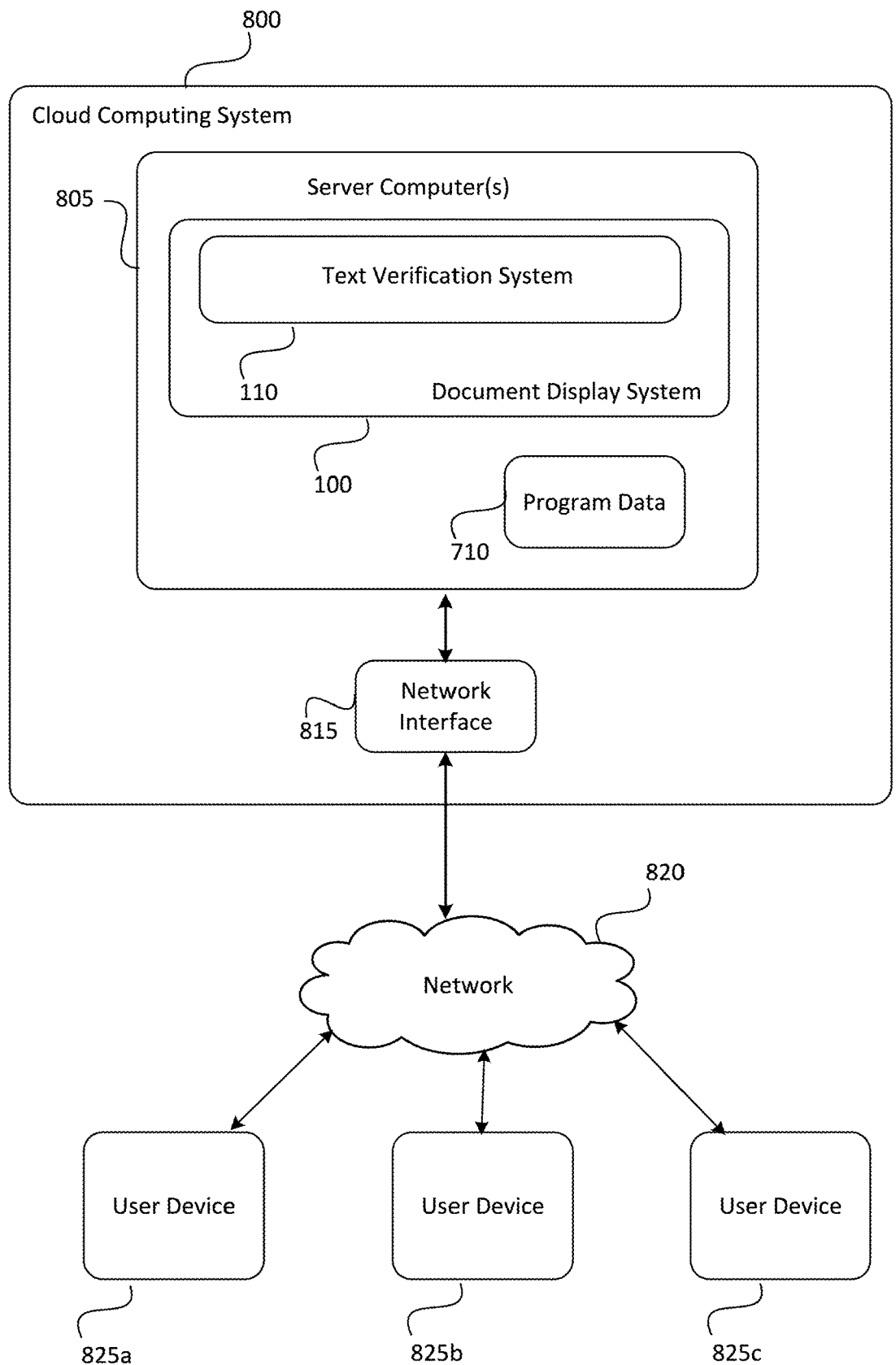
FIG. 8 depicts an example of a cloud computing system for implementing certain aspects described herein.
Figure 9:
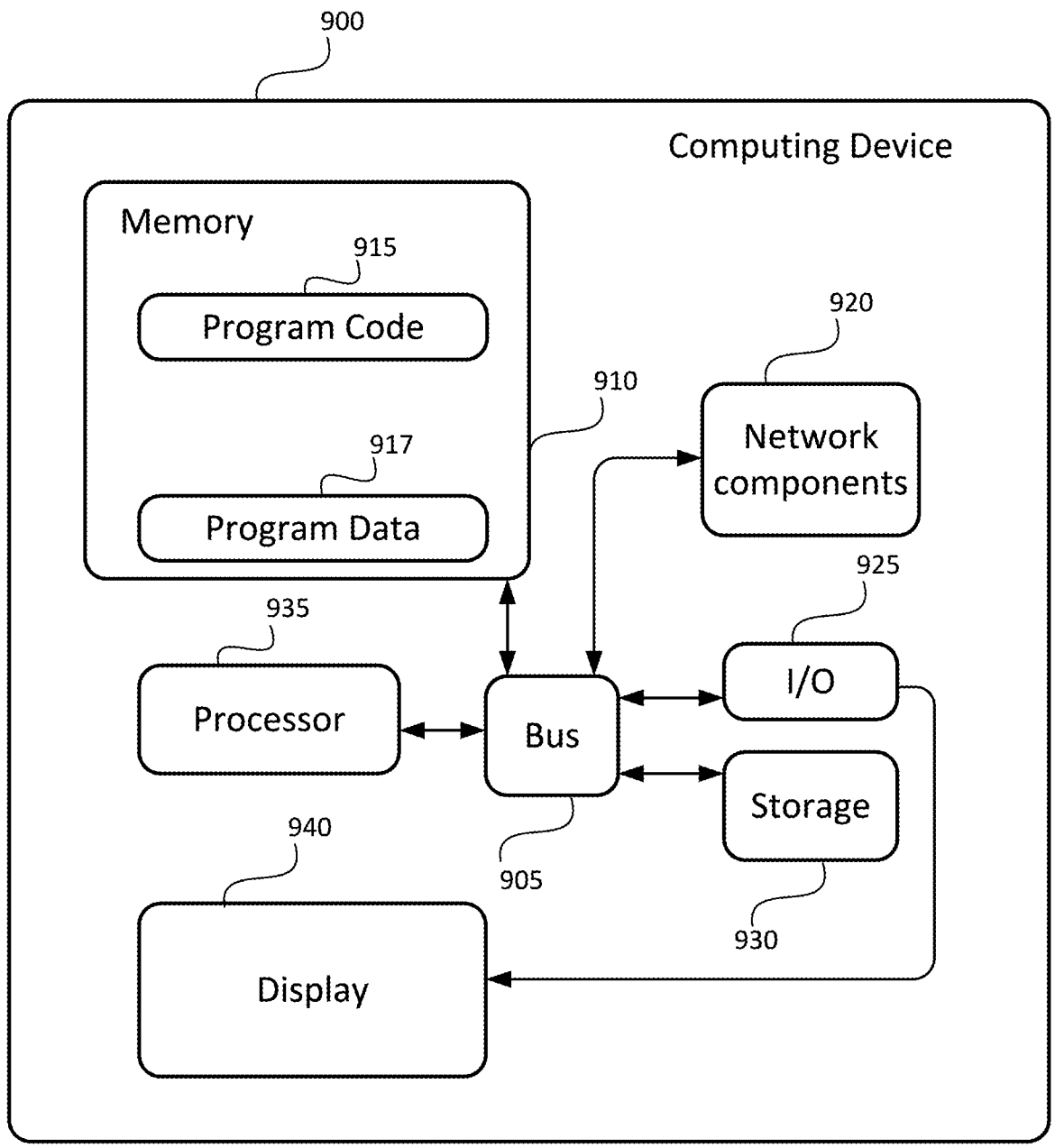
FIG. 9 depicts an example of a computing system for implementing certain aspects described herein.

Any suitable computing system or group of computing systems can be used for performing the operations described herein. For example, FIG. 9 depicts an example of computing device 900 that may be at least a portion of document display system 100. The implementation of the computing device 900 could be used for one or more of the electronic document reader 105 or the user system 135. In an implementation, a single document display system 100 having devices similar to those depicted in FIG. 9 (e.g., a processor, a memory, etc.) combines the one or more operations and data stores depicted as separate subsystems in FIG. 1. Further, FIG. 8 illustrates a cloud computing system 800 by which at least a portion of the document display system 100 may be offered.

In some implementations, the functionality provided by the document display system 100 may be offered as cloud services by a cloud service provider. For example, FIG. 8 depicts an example of a cloud computing system 800 offering an image editing service that can be used by a number of user subscribers using user devices 825a, 825b, and 25c across a data network 820. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 805.

The remote server computers 805 include any suitable non-transitory computer-readable medium for storing program code (e.g., a document display system 100) and program data 810, or both, which is used by the cloud computing system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 805 can include volatile memory, non-volatile memory, or a combination thereof.

One or more of the servers 805 execute the program code 810 that configures one or more processors of the server computers 805 to perform one or more of the operations that provide image editing services, including the ability to utilize the text verification system 110 to perform shot-matching and other image editing techniques. As depicted in the implementation in FIG. 8, the one or more servers providing the services to perform image editing via the text verification system 110 may include access to the models of the text verification system 110 including the document retrieval system 115, the two-stage evidence selection system 120, and the specialized reasoning model 125. Any other suitable systems or subsystems that perform one or more operations described herein (e.g., one or more development systems for configuring an interactive user interface) can also be implemented by the cloud computing system 800.

In certain implementations, the cloud computing system 800 may implement the services by executing program code and/or using program data 810, which may be resident in a memory device of the server computers 805 or any suitable computer-readable medium and may be executed by the processors of the server computers 805 or any other suitable processor.

In some implementations, the program data 810 includes one or more datasets and models described herein. Examples of these datasets include image data, new image content, image energy data, etc. In some implementations, one or more of data sets, models, and functions are stored in the same memory device. In additional or alternative implementations, one or more of the programs, data sets, models, and functions described herein are stored in different memory devices accessible via the data network 815.

The cloud computing system 800 also includes a network interface device 815 that enable communications to and from cloud computing system 800. In certain implementations, the network interface device 815 includes any device or group of devices suitable for establishing a wired or wireless data connection to the data networks 820. Non-limiting examples of the network interface device 815 include an Ethernet network adapter, a modem, and/or the like. The document display system 100 is able to communicate with the user devices 825a, 825b, and 825c via the data network 820 using the network interface device 815.

FIG. 9 illustrates a block diagram of an example computer system 900. Computer system 900 can be any of the described computers herein including, for example, electronic document reader 105, user system 135, or server computer 805. The computing device 900 can be or include, for example, a laptop computer, desktop computer, tablet, server, or other electronic device.

The computing device 900 can include a processor 935 interfaced with other hardware via a bus 905. A memory 910, which can include any suitable tangible (and non-transitory) computer readable medium, such as RAM, ROM, EEPROM, or the like, can embody program components (e.g., program code 915) that configure operation of the computing device 800. Memory 910 can store the program code 915, program data 917, or both. In some examples, the computing device 900 can include input/output ("I/O") interface components 925 (e.g., for interfacing with a display 940, keyboard, mouse, and the like) and additional storage 930.

The computing device 900 executes program code 915 that configures the processor 935 to perform one or more of the operations described herein. Examples of the program code 915 include, in various implementations, the text verification system 110 including the document retrieval system 115, the two-stage evidence selection system 120, and the specialized reasoning model 125, the image editing function, or any other suitable systems or subsystems that perform one or more operations described herein (e.g., one or more development systems for configuring an interactive user interface). The program code 915 may be resident in the memory 910 or any suitable computer-readable medium and may be executed by the processor 940 or any other suitable processor.

The computing device 900 may generate or receive program data 917 by virtue of executing the program code 915. For example, the source image and modified source image are all examples of program data 917 that may be used by the computing device 900 during execution of the program code 915.

The computing device 900 can include network components 920. Network components 920 can represent one or more of any components that facilitate a network connection. In some examples, the network components 920 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 920 can be wired and can include interfaces such as Ethernet, USB, or IEEE 1394.

Although FIG. 9 depicts a single computing device 900 with a single processor 935, the system can include any number of computing devices 900 and any number of processors 935. For example, multiple computing devices 900 or multiple processors 935 can be distributed over a wired or wireless network (e.g., a Wide Area Network, Local Area Network, or the Internet). The multiple computing devices 900 or multiple processors 935 can perform any of the steps of the present disclosure individually or in coordination with one another.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method, comprising:
receiving an input indicating a selection of a target text segment;
determining a veracity metric of the target text segment by, at least:
extracting a first text segment from an electronic document;
generating, using a trained reasoning model, an output classifying the first text segment as lacking information to support or refute the target text segment;
extracting a second text segment from the electronic document or another electronic document in response to classifying the first text segment as lacking information to support or refute the target text segment; and
classifying, with the trained reasoning model, a combination of the first text segment and the second text segment according to a degree to which the trained reasoning model measures whether the combination supports the target text segment; and generating an augmentation for a graphical interface to display, adjacent to the target text segment, a verification indicator representing the determined veracity metric of the target text segment.

2. The computer-implemented method of claim 1, further comprising:

augmenting the graphical interface by displaying the augmentation and a target electronic document that includes the target text segment, wherein displaying the augmentation includes presenting the verification indicator in association with the target text segment on the graphical interface.

3. The computer-implemented method of claim 1, further comprising:

generating, using a graph construction network, a first-stage graph including a plurality of nodes, each node of the plurality of nodes representing a text segment extracted from the electronic document, wherein one of the nodes of the plurality of nodes represents the first text segment, and wherein:

during a first stage of reasoning, generating the first-stage graph, such that none of the plurality of nodes of the first-stage graph are connected to each other.

4. The computer-implemented method of claim 3, further comprising:

generating, using a specialized reasoning model, the verification indicator for the first text segment, wherein the verification indicator represents an inference indicating that:

the first text segment supports the target text segment;
the first text segment refutes the target text segment; or
the first text segment lacks information to support or refute the target text segment; and evaluating, using the specialized reasoning model, the first-stage graph using the target text segment to generate the verification indicator for the first text segment.

5. The computer-implemented method of claim 3, further comprising:

generating a second-stage graph including a plurality of nodes, wherein at least one of the plurality of nodes represents the second text segment, and wherein:

during a second stage of reasoning, generating a second-stage graph by modifying the first-stage graph, wherein the modifying includes connecting at least two nodes of the plurality of nodes of the first-stage graph, and wherein connecting the at least two nodes together indicates a relationship between multiple text segments associated with the at least two connected nodes.

6. The computer-implemented method of claim 5, further comprising:

generating, using a specialized kernel graph attention model, the verification indicator for a combination of the first text segment and the second text segment, wherein the verification indicator represents an inference indicating that:

the combination of the first text segment and the second text segment supports the target text segment;
the combination of the first text segment and the second text segment refutes the target text segment; or
the combination of the first text segment and the second text segment lacks information to support or refute the target text segment; and wherein, during the second stage of reasoning, evaluating, using the specialized kernel graph attention model, the second-stage graph using the target text segment to generate the verification indicator.

7. The computer-implemented method of claim 1, wherein extracting the first text segment from the electronic document further comprises:

inputting each text segment of the electronic document into a first-stage Bidirectional Encoder Representation from Transformers (BERT) model to generate a first-stage relevance score for the text segment; and
selecting the first text segment for extraction based on the first-stage relevance score associated with the first text segment; and wherein extracting the second text segment further comprises:

inputting each text segment of one or more electronic documents hyperlinked with the first text segment into a second-stage BERT model to generate a second-stage relevance score for the text segment; and
selecting the second text segment for extraction based on the second-stage relevance score associated with the second text segment.

8. A computer-program product tangibly embodied in a non-transitory machine-readable storage medium, including instructions configured to cause a processing apparatus to perform operations including:

identifying a target text segment included in a target electronic document;
determining a veracity metric of the target text segment at least in part by:
determining that a first text segment lacks information to support or refute the target text segment;
obtaining a second text segment in response to determining that the first text segment lacks information to support or refute the target text segment; and
generating, using a trained reasoning model, an indicator of the veracity metric based on the first text segment and the second text segment; and outputting an augmentation for the target electronic document, the augmentation including a verification indicator indicating the determined veracity metric of the target text segment.

9. The non-transitory machine-readable storage medium of claim 8, further comprising:

generating, using a graph construction network, a first-stage graph including a plurality of nodes, each node of the plurality of nodes representing a text segment extracted from an electronic document, wherein one of the nodes of the plurality of nodes represents the first text segment extracted from the electronic document, and wherein:

during a first stage of reasoning, generating the first-stage graph, such that none of the plurality of nodes of the first-stage graph are connected to each other.

10. The non-transitory machine-readable storage medium of claim 9, further comprising:

generating, using a specialized reasoning model, the verification indicator for the first text segment, wherein the verification indicator represents an inference indicating that:

the first text segment supports the target text segment;
the first text segment refutes the target text segment; or
the first text segment lacks information to support or refute the target text segment; and evaluating, using the specialized reasoning model, the first-stage graph using the target text segment to generate the verification indicator for the first text segment.

11. The non-transitory machine-readable storage medium of claim 9, further comprising:
generating, using a tree construction network, a second-stage graph including a plurality of nodes, wherein at least one of the plurality of nodes represents the second text segment, the second text segment being extracted from the electronic document or another electronic document, and wherein:
during a second stage of reasoning, generating a second-stage graph by modifying the first-stage graph, wherein the modifying includes connecting at least two nodes of the plurality of nodes of the first-stage graph, and wherein connecting the at least two nodes together indicates a relationship between multiple text segments associated with the at least two connected nodes.

12. The non-transitory machine-readable storage medium of claim 11, further comprising:
generating, using a specialized kernel graph attention model, the verification indicator for a combination of the first text segment and the second text segment, wherein the verification indicator represents an inference indicating that:
the combination of the first text segment and the second text segment supports the target text segment;
the combination of the first text segment and the second text segment refutes the target text segment; or
the combination of the first text segment and the second text segment lacks information to support or refute the target text segment; and
wherein, during the second stage of reasoning, evaluating, using the specialized kernel graph attention model, the second-stage graph using the target text segment to generate the verification indicator.

13. The non-transitory machine-readable storage medium of claim 8, wherein determining the veracity metric of the target text segment further comprises:
extracting the first text segment from an electronic document using a first-stage BERT model; and
extracting the second text segment from the electronic document or another electronic document using a second-stage BERT model.

14. A system comprising:
one or more processors; and
a non-transitory computer-readable medium communicatively coupled to the one or more processors and storing program code executable by the one or more processors, the program code implementing a text verification system configured to determine a veracity metric of a target text segment, the text verification system comprising:
a first-stage text retrieval model configured to infer a relevance between a first text segment included in an electronic document and the target text segment, the first text segment being selected for extraction from the electronic document based on the inferred relevance;
a reasoning model configured to classify the first text segment as lacking information to support or refute the target text segment; and
a second-stage text retrieval model configured to extract a second text segment from the electronic document or another electronic document in response to the first text segment being classified as lacking information to support or refute the target text segment, and
wherein the reasoning model is further configured to generate an indicator of the veracity metric based on a combination of the first and second text segments, wherein the indicator of the veracity metric is usable for augmenting a target electronic document with a verification indicator that is selectively displayable adjacent to the target text segment.

15. The system of claim 14, wherein the text verification system further comprises an augmentation system configured to augment a target electronic document displaying the target text segment, wherein augmenting the target electronic document includes presenting a verification indicator in association with the target text segment, and wherein the verification indicator represents the classification outputted by the reasoning model.

16. The system of claim 14, wherein the reasoning model further comprises:
a graph construction network configured to generate a first-stage graph including a plurality of nodes, each node of the plurality of nodes representing a text segment extracted from the electronic document by the first-stage text retrieval model, wherein one of the nodes of the plurality of nodes represents the first text segment, and wherein:
during a first stage of reasoning, the graph construction network generates the first-stage graph, such that none of the plurality of nodes of the first-stage graph are connected to each other.

17. The system of claim 16, wherein the reasoning model further comprises:
a specialized kernel graph attention model configured to generate a verification indicator for the first text segment, wherein the verification indicator represents an inference indicating that:
the first text segment supports the target text segment;
the first text segment refutes the target text segment; or
the first text segment lacks information to support or refute the target text segment; and
wherein the specialized kernel graph attention model evaluates the first-stage graph using the target text segment to generate the verification indicator for the first text segment.

18. The system of claim 16, wherein the graph construction network is further configured to:
generate a second-stage graph including the plurality of nodes and one or more new nodes, wherein a new node of the one or more new nodes represents the second text segment extracted by the second-stage text retrieval model, and wherein:
during a second stage of reasoning, the graph construction network generates the second-stage graph by modifying the first-stage graph, wherein the modifying includes connecting at least two nodes of the plurality of nodes of the first-stage graph, and wherein connecting the at least two nodes together indicates a relationship between multiple text segments associated with the at least two connected nodes.

19. The system of claim 18, wherein the reasoning model further comprises:
a specialized kernel graph attention model configured to generate a verification indicator for a combination of the first text segment and the second text segment, wherein the verification indicator represents an inference indicating that:
the combination of the first text segment and the second text segment supports the target text segment;
the combination of the first text segment and the second text segment refutes the target text segment; or the combination of the first text segment and the second text segment lacks information to support or refute the target text segment; and wherein, during the second stage of reasoning, the specialized kernel graph attention model evaluates the second-stage graph using the target text segment to generate the verification indicator.

20. The system of claim 14, wherein the target text segment is displayed at a user device by a document display system.

* * * * *